United States Patent [19]

Baumbach

[11] 3,743,888
[45] July 3, 1973

[54] LINE PROTECTOR FOR A COMMUNICATION CIRCUIT

[75] Inventor: Bertram W. Baumbach, Arlington Heights, Ill.

[73] Assignee: Reliable Electric Company, Franklin Park, Ill.

[22] Filed: Aug. 24, 1972

[21] Appl. No.: 283,492

[52] U.S. Cl................... 317/16, 317/61.5, 337/15, 337/32
[51] Int. Cl. .............................................. H02h 3/38
[58] Field of Search......................... 337/32, 33, 15; 317/16, 31, 61.5

[56] References Cited
UNITED STATES PATENTS

| | | | |
|---|---|---|---|
| 3,255,330 | 6/1966 | MacKenzie et al. | 337/34 X |
| 3,573,695 | 4/1971 | Geyer et al. | 337/32 X |
| 3,587,021 | 6/1971 | Baumbach | 337/32 |

*Primary Examiner*—James D. Trammell
*Attorney*—Roy H. Olson, Richard R. Trexler et al.

[57] ABSTRACT

A plug-in line protector for a communications circuit provides protection for overvoltage and overcurrent conditions of the line. A module containing carbon blocks provides an air gap in an overvoltage shunt circuit for grounding high voltage transients. For an overcurrent condition in that shunt circuit, a solder pellet melts causing contacts in an overcurrent shunt circuit to engage and ground the line. The protector also has an overcurrent responsive mechanism in the form of a heat coil in the line. When the coil is heated, it melts the solder pellet and closes the contacts in the overcurrent shunt circuit. One of those contacts is a bobbin around which the heat coil is wrapped and which serves to transfer heat to the solder pellet.

10 Claims, 5 Drawing Figures

Patented July 3, 1973    3,743,888

LINE PROTECTOR FOR A COMMUNICATION CIRCUIT

CROSS-REFERENCE TO RELATED APPLICATION

Reference may be had to my copending application Ser. No. 187,018 filed Oct. 6, 1971.

BACKGROUND OF THE INVENTION

Line protectors of the type with which the present invention is concerned are generally located between banks of telecommunications equipment. Such protectors may be interposed between central office switching equipment and inside switching-related equipment. These protectors serve the primary purpose of protecting the inside equipment from damage as a result of overvoltage and overcurrent conditions on the outside line.

SUMMARY AND OBJECTS OF THE INVENTION

The protector is typically designed for protection of two lines of a communcations circuit. Each circuit is provided with protection against both overvoltage and overcurrent. For this purpose an arrester module is provided for each circuit. When an overvoltage of short duration is applied to either or both of the incoming lines connected to the protector, the protector provides an arc gap path in an overvoltage shunt circuit to ground so that the overvoltage does not reach inside equipment or central office equipment. When an overvoltage fault is of prolonged duration, or an overcurrent voltage is such that there is arcing across the arc gap, the current passing through the overvoltage shunt circuit generates sufficient heat to melt a fusible solder pellet in the overvoltage shunt circuit. Then the line will be grounded through an overcurrent shunt circuit. In addition, there is a heat coil in the line circuit for supplying heat to melt the solder pellet in the event of an overcurrent condition that may not cause arcing across the arc gap. In such case the solder pellet will melt and close the overcurrent shunt circuit to ground.

The module contains normally spaced apart contacts in the form of a cup and a bobbin, both surrounded by an insulating sleeve to prevent possible arc-over between the adjacent module for the other line. These contacts are in the overcurrent shunt circuit. The cup rests on the metallic ground strip. The heat coil is wrapped around a shaft on the bobbin whereby heat from the heat coil heats the bobbin which in turn transmits heat to the solder pellet. The upper end of the bobbin shaft has an insulator with a peripheral metal ring, and the heat coil is connected to the peripheral ring and bobbin. The ring and bobbin along with the heat coil are in series with the line. The bobbin and ring are respectively engaged by contact members that connect to line terminal pins of the protector. One of the contact members constitutes a spring that urges together the contacts of the overcurrent shunt circuit upon melting of the solder pellet either by the heat coil or by current through the overvoltage shunt circuit.

Accordingly, it is an object of this invention to provide a line protector of the type stated in which overvoltage and overcurrent protection are provided, and wherein a heat coil in the line circuit is uniquely positioned in proximity to a solder pellet in the overvoltage shunt circuit such that the solder pellet can be melted by sufficient current in the overvoltage shunt circuit or sufficient heat that is generated by the heat coil.

Another object of this invention is to provide a line protector embodying a heat coil and bobbin assembly that is simple and can be mass produced at relatively low cost.

Another object of this invention is to provide a protector of the type stated in which the heat coil is reuseable in that only the solder pellet need be replaced to restore the unit to normal operation.

DETAILED DESCRIPTION

Figure 1:
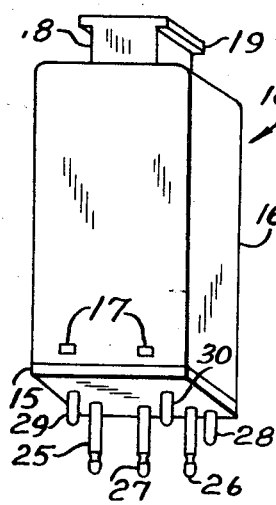
FIG. 1 is a perspective view of a plug-in type of line protector constructed in accordance with and embodying the present invention.

Referring now in more detail to the drawing, 10 designates a protector for a pair of communcations lines. However, it will be appreciated that the principles of the invention are applicable to a protector for a single line only.

The protector 10 comprises a base 15 and an elongated detachable housing 16 of generally rectangular cross section. The base 15 and housing 16 are of a suitable dielectric plastic material. The housing 16 may be secured to the base 15 by bosses 17 which snap into correspondingly shaped openings in the side walls of the housing 16. The upper end of the housing 16, namely that remote from the base 15, may have a neck portion 18 terminating in a flange 19 by which the protector may be gripped for removal from and placement into a receptacle.

Mounted in and projecting outwardly from the base 15 is a series of conductive plug-in terminal pins identified by the reference numerals 25–30 inclusive. In the form of the invention shown, there is a first line pin 25, a first central office pin 29, a second line pin 26, a second central office pin 30, a polarizing pin 28, and a ground pin 27. The first line pin 25 and the first central office pin 29 are components in one of the lines through the protector 10 while the second line pin 26 and second central office pin 30 are components in the other line through the protector 10. The ground pin 27 is common to both lines while the polarizing pin 28 is an unconnected or "dummy" pin that assures proper orientation of the protector unit when it is plugged into its receptacle.

Figure 2:
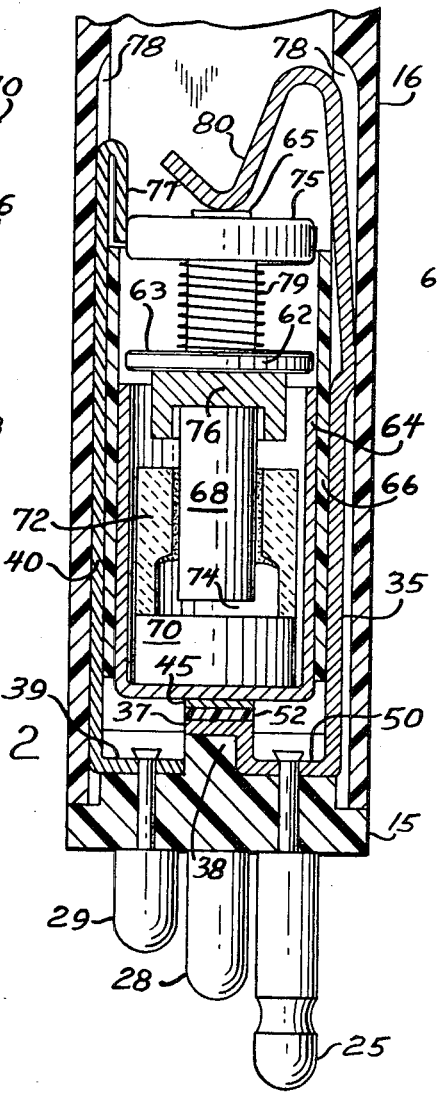
FIG. 2 is a fragmentary side view in section of the protector.
Figure 3:
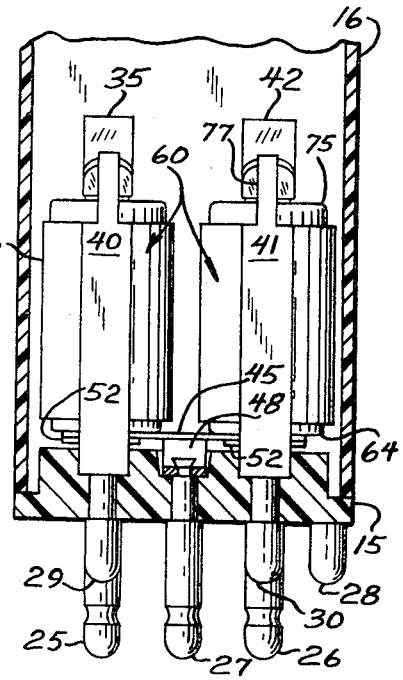
FIG. 3 is a fragmentary front view in partial section of the protector.
Figure 4:
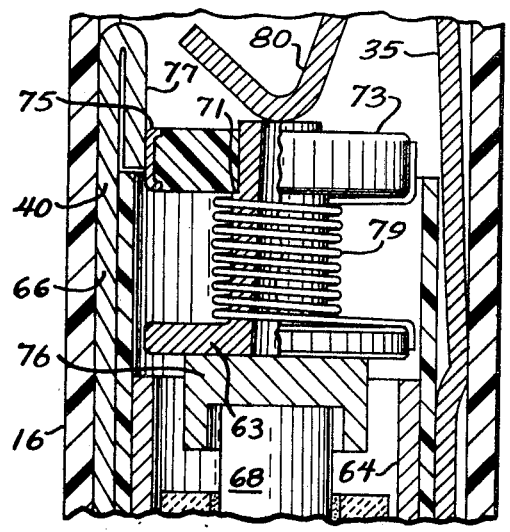
FIG. 4 is an enlarged fragmentary portion of FIG. 3 in the region of the heat coil.

The pin 25 is electrically and mechanically connected to a contact member 35 which is formed of flat spring-like material. As best shown in FIG. 2, the contact member 35 has a base portion 37 that seats on an elongated rib 38 on the base 15. The base portion 37 has a flange 50 at which the pin 25 is staked. In like manner, contact member 42, which is identical to contact member 35, is connected to the pin 26.

An additional contact member 40 is staked at its bottom flange 39 to the pin 29. Likewise, a contact 41 of a construction similar to that of the contact 40 is staked to the pin 30.

For each of the two lines there is provided a removable and replaceable arrester module 60 for providing a first shunt circuit to the ground pin 27 in the event of an overcurrent condition and a second shunt circuit to the ground pin in the event of an overvoltage condition. The modules are identical and each includes metallic contacts in the form of a bobbin 62 and cup 64. The bobbin 62 and cup 64 are surrounded by an insulating sleeve 66. Within the cup 64 is a carbon arc gap assembly comprising carbon blocks 68, 70 and an insulating member 72. The carbon block 68 is suitably bonded to the insulating member 72, the latter bearing at one end against the carbon block 70 to constitute a spacer so that an air gap 74 is established between the carbon blocks 68, 70. The air gap 74 is determined by the minimum arc-over voltage for which the unit is designed. A fusible solder pellet 76 is interposed between the carbon block 68 and the bobbin 62 so that in the normal operating condition of the unit, the cylindrical base or disc part 63 of the bobbin and the edge of the cup 64 are maintained spaced apart.

The upwardly extended parts of the respective contact members 35, 42, 40, 41 lie in grooves 78 formed in sidewalls of the housing 16. Each of those upwardly extending parts of the contact members 35, 42 terminates in a downwardly extending generally V shaped portion 80 which bears firmly against upper end of the shaft 65 of the associated bobbin 62. Thus, each contact member 35, 42 constitutes a spring tending to urge the bobbin 62 toward the cup 64; however, engagement of the cup 64 and slug 62 is prevented, in the normal operation of the protector, by the solder pellet 76.

The bobbin shaft 65 is diametrally reduced to form a shoulder 71 for supporting a cylindrical insulating member 73. An enveloping metallic contact ring 75 is secured to the periphery of the insulating member 73 for sliding engagement with the downwardly turned end 77 of the contact 40 or 41, as the case may be. A heat coil of wire 79 is wrapped around the bobbin shaft 65 intermediate the shoulder 71 and disc 63 and with the ends of the heat coil 79 being soldered to the peripheral part of the disc 63 and to the ring 75. The bobbin shaft 65 is hollow which is tapered for mounting on a mandrel so that the heat coil may be wound in place.

In the normal operating condition of the protector, current flows in a line circuit running from pin 29, through contact member 40, ring 75, heat coil 79, bobbin 62, contact member 35 and to pin 25. In the other line circuit from pin 26 to pin 30 the current flow is through contact members 41, 42, and the heat coil, bobbin and contact ring of the associated module 60.

A grounding strip 45 has a depending leg 48 that is staked to the ground pin 27. The bottoms of the respective cups 64 rest upon the grounding strip 45 whereby the cups 64 are grounded. On opposite sides of the leg 48 the grounding strip 45 has thin dielectric tape strips 52, 52 which are downwardly presented and are against the base portions of the contacts 35, 42. The tape strips 52, 52 insulate the cups 52 from the contact members 35, 42.

When an overvoltage condition of relatively short duration is applied to one of the lines, for example at pin 25, the contact 35 provides a conductive path through its upper V shaped end 80, through bobbin 62, solder pellet 76 and to carbon block 68. If the overvoltage is at pin 29, the contact member 40 provides the conductive path through the heat coil 79 to the bobbin 62. This overvoltage transient will arc across gap 74 to carbon block 70 and will be grounded through the grounding strip 45 to the ground pin 27. Under such conditions the solder pellet 76 does not melt. The components of the protector remain in the condition shown for instance in FIG. 2, and nothing need be done to restore the protector to its normal operating condition. Similarly, if an overvoltage condition appears on the other line, namely the line in which pins 26 and 30 are located, the ground is through the contact 41 or 42 and the module 60 associated therewith, in the manner previously described.

Figure 5:
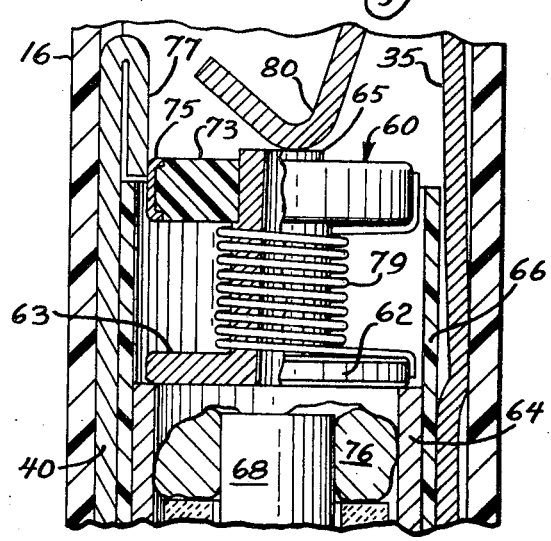
FIG. 5 is a view similar to FIG. 4 and showing one of the arrester units after melting of the solder pellet therein.

An overcurrent condition may appear in one of the lines due to a prolonged voltage that is above arcing voltage. Assuming that such overcurrent conditions appears on the line containing pin 25 and pin 29 the current through the associated module 60 will cause the solder pellet 76 to melt, as shown in FIG. 5, since the solder pellet is in the overvoltage shunt circuit. When the solder pellet 76 melts, the spring force applied by the contact 35 moves the bobbin 62, heat coil 79 and insulator 73 as a unit while maintaining the contact member 35 against the bobbin end and maintaining the contact member 40 against the ring 75. This spring force causes the bobbin disc 63 to engage the upper edge of the cup 64 whereby a metallic ground connection to the ground pin 27 is made through grounding strip 45. The base of the cup 62 is pressed firmly against the grounding strip 45 by reason of the spring pressure from the contact 35 so as to insure a low resistance flow path for the current. If an overcurrent condition as aforesaid, appears in the line containing the pins 26, 30, a ground connection through to the pin 27 will result in the manner just described, except that the ground will be through contact member 41 or 42 and the corresponding parts in the associated arrester module 60.

If desired, the plastic strips 52 may be of a type that will melt if sufficient heat is transmitted thereto from the carbon block 70 through the cup 64. This may occur in some kinds of overcurrent conditions, for instance where there is sufficient voltage for arc-over but the current is insufficient to melt the solder pellet. Melting of the plastic strip 52 results in a short metallic path to ground from the contact member 35 or 42, as the case may be, and the spring pressure of the contact member 35 or 42 will push the resilient strip 45 against the base portion 37 of the contact member.

Overcurrent protection is also afforded by the heat coil 79 that is in each module 60 and hence in each line circuit. The operation of the heat coil for each line circuit is the same and so it will suffice to describe such operation for one line circuit, for instance the circuit with pins 25 and 29.

The heat coil 79 is designed to produce sufficient heat to melt the solder pellet 76 when a predetermined amount of current in magnitude and/or duration flows through the line circuit. This current may appear in the line circuit even though the voltage produced at the arc gap is insufficient for arc-over, and such current may, without protection therefrom, damage equipment in the line. Accordingly, when such overcurrent condition heats the wire of the heat coil 79, the heat is transmitted to the bobbin 62. The bottom of the disc 63 seats against the solder pellet 76 over a relatively large area so that heat from the bobbin is readily transmitted to the solder pellet 76 causing it to melt, as shown in FIG.

5. Thereafter, the spring pressure from contact member 35 pushes the bobbin disc 63 against the upper edge of the cup 64 to complete the overcurrent shunt circuit to the grounding strip 45 and to the ground pin 27.

The protector can be restored to normal operation by removing the housing 16 and then removing the affected module 60. The module 60 may be disassembled, the melted solder of the solder pellet may be removed, a new solder pellet may then be installed, and then the parts can be reassembled. The heat coil 79, bobbin 62 and insulating member 73 may be reused, thereby reducing the cost of restoring the protector.

The invention is claimed as follows:

1. A line protector for a communications circuit, said protector having line terminals and a line circuit connected therebetween, a ground terminal, a first normally open shunt circuit from said line circuit to said ground terminal, said first shunt circuit having contacts, spring means biasing said contacts toward each other, a solder element normally maintaining said contacts apart in opposition to said spring means, and a second shunt circuit from said line circuit to ground, said second shunt circuit including blocks forming an arc gap, said solder element being in series with said blocks, whereby an overvoltage of short duration in said second shunt circuit produces an arc at said gap without melting of said solder element and an overvoltage condition of longer duration also produces said arc and causes said solder element to melt and close said contacts, said line circuit including means responsive to an overcurrent condition therein and in close proximity to said solder element for melting said solder element, whereby an overcurrent condition in either said line circuit or said second shunt circuit closes said first shunt circuit.

2. A line protector according to claim 1 in which said last-mentioned means comprises a coil of wire in series with the line terminals for generating heat in response to said overcurrent condition in said line circuit, and a metallic member around which said coil is wrapped for transmitting heat to said solder element.

3. A line protector according to claim 2 in which said metallic member comprises a bobbin having a disc that engages said solder element and a shaft around which the coil is wrapped.

4. A line protector according to claim 3 in which said shaft has an insulating member mounted thereon, said insulating member having a peripheral metal ring, and said coil is connected to said ring and to said bobbin so that said bobbin, said coil and said ring form a series circuit.

5. A line protector according to claim 4 including contact members in electrical connection with said line terminals respectively and with said ring and said bobbin respectively.

6. A line protector according to claim 1 in which said last-mentioned means comprises a heat coil in series with said line terminals.

7. A line protector according to claim 2 in which said metallic member also comprises one of said contacts in said first shunt circuit.

8. In a line protector for a communications circuit that includes contacts, a solder element normally maintaining said contacts spaced apart, and spring means urging said contacts together in opposition to said solder element; one of said contacts comprising a metallic member for transmitting heat to said solder element, a coil of wire wrapped around said metallic member, an insulating member on said metallic member, and a metallic ring peripherally secured to said insulating member.

9. In a line protector according to claim 8, said metallic member having a shaft upon which said insulating member is mounted, and said coil is wrapped around said stem.

10. In a line protector according to claim 8, said insulating member, said metallic member, and said coil being movable as a unit by said spring means upon melting of said solder element.

* * * * *